(12) United States Patent
Nickolov et al.

(10) Patent No.: US 8,619,083 B2
(45) Date of Patent: Dec. 31, 2013

(54) MULTI-LAYER IMAGE COMPOSITION WITH INTERMEDIATE BLENDING RESOLUTIONS

(75) Inventors: Radoslav Petrov Nickolov, Seattle, WA (US); Lutz Gerhard, Seattle, WA (US); Ming Liu, Redmond, WA (US); Raman Narayanan, Bellevue, WA (US); Drew Edward Steedly, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 705 days.

(21) Appl. No.: 12/349,337

(22) Filed: Jan. 6, 2009

(65) Prior Publication Data
US 2010/0171759 A1  Jul. 8, 2010

(51) Int. Cl.
*G06T 17/00* (2006.01)
(52) U.S. Cl.
USPC .......................................... 345/428; 345/634
(58) Field of Classification Search
USPC ................................................. 345/634, 428
See application file for complete search history.

(56) References Cited

U.S. PATENT DOCUMENTS

| | | | |
|---|---|---|---|
| 6,239,807 B1 | 5/2001 | Bossut | |
| 6,747,649 B1 * | 6/2004 | Sanz-Pastor et al. | 345/428 |
| 6,774,898 B1 | 8/2004 | Katayama et al. | |
| 7,002,602 B2 | 2/2006 | MacInnis et al. | |
| 7,075,535 B2 | 7/2006 | Aguera y Arcas | |
| 7,102,652 B2 | 9/2006 | O'Donnell et al. | |
| 7,110,137 B2 | 9/2006 | Burgess et al. | |
| 2002/0021758 A1 | 2/2002 | Chui | |
| 2006/0038823 A1 | 2/2006 | Arcas | |
| 2006/0250415 A1 | 11/2006 | Stevenson | |
| 2007/0002071 A1 | 1/2007 | Hoppe et al. | |
| 2007/0252834 A1 * | 11/2007 | Fay | 345/428 |
| 2008/0024390 A1 | 1/2008 | Baker et al. | |
| 2008/0028335 A1 | 1/2008 | Rohrabaugh et al. | |

OTHER PUBLICATIONS

"NASA Great Zooms: A Case Study", retrieved at <<http://svs.gsfc.nasa.gov/stories/zooms/zoompg2.html>>, Oct. 20, 2008, pp. 3.
El Santo, "Trilinear Mipmap Interpolation", Retrieved at <<http://everything2.com/title/Trilinear+mipmap+interpolation, Retrieved on Jan. 31, 2012, pp. 1.
Shirah, et al., "NASA Great Zooms: A Case Study", In IEEE Visualization, Oct. 27, 2002, pp. 4.

* cited by examiner

*Primary Examiner* — James A Thompson
*Assistant Examiner* — Peter Hoang

(57) ABSTRACT

Providing high frame rate image rendering using multiple image layers per frame. A plurality of image layers having different resolutions are arranged in order of increasing resolution. Beginning with the image layer having the lowest resolution, the image layer is upsampled to a resolution of a next image layer having a higher resolution. The upsampled image layer is blended with the next image layer. The upsampling and blending continues for each of the image layers to produce a blended image. The blended image is provided for display as a frame of video. Aspects of the invention produce a high-resolution composite image during animated navigation across zoom and pan states.

20 Claims, 6 Drawing Sheets

MULTI-LAYER IMAGE COMPOSITION WITH INTERMEDIATE BLENDING RESOLUTIONS

BACKGROUND

Existing systems composite multiple layers of raster or vector image content to produce a final image. Typical scenarios include a user zooming or panning an image of a map, where each frame requires the composition of multiple image layers (e.g., up to twenty or more in some examples) having differing resolutions. As shown in FIG. 1, with existing systems, each of the image layers is upsampled to the size or resolution of the final image. As such, the performance of existing systems degrades linearly with each additional layer to composite as each of the pixels in the final image are adjusted with the processing of each of the layers. Accordingly, many existing systems fail to provide smooth, animated navigation across zoom/pan states while providing a crisp composite image having the proper image data for any of the given zoom/pan states.

Some other systems improve the frame rate by relying on fast hardware (e.g., dedicated graphics processors and memory) to perform the rendering. However, only computing devices having the specific hardware needed for such systems benefit from these implementations. Additionally, because the rendered frame rate degrades linearly with each additional layer, frame rate performance declines as additional layers are processed even with hardware-accelerated rendering.

SUMMARY

Embodiments of the invention enable smooth, continuous image rendering using multiple image layers per frame. A plurality of image layers having different resolutions are received for display. The image layers are arranged in order of increasing resolution. Starting with the image layer having the lowest resolution, the image layer is upsampled to a resolution of a next image layer having a higher resolution. The upsampled image layer is blended with the next image layer. The upsampling and blending continues for each of the image layers to produce a blended image. The blended image is provided for display on the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
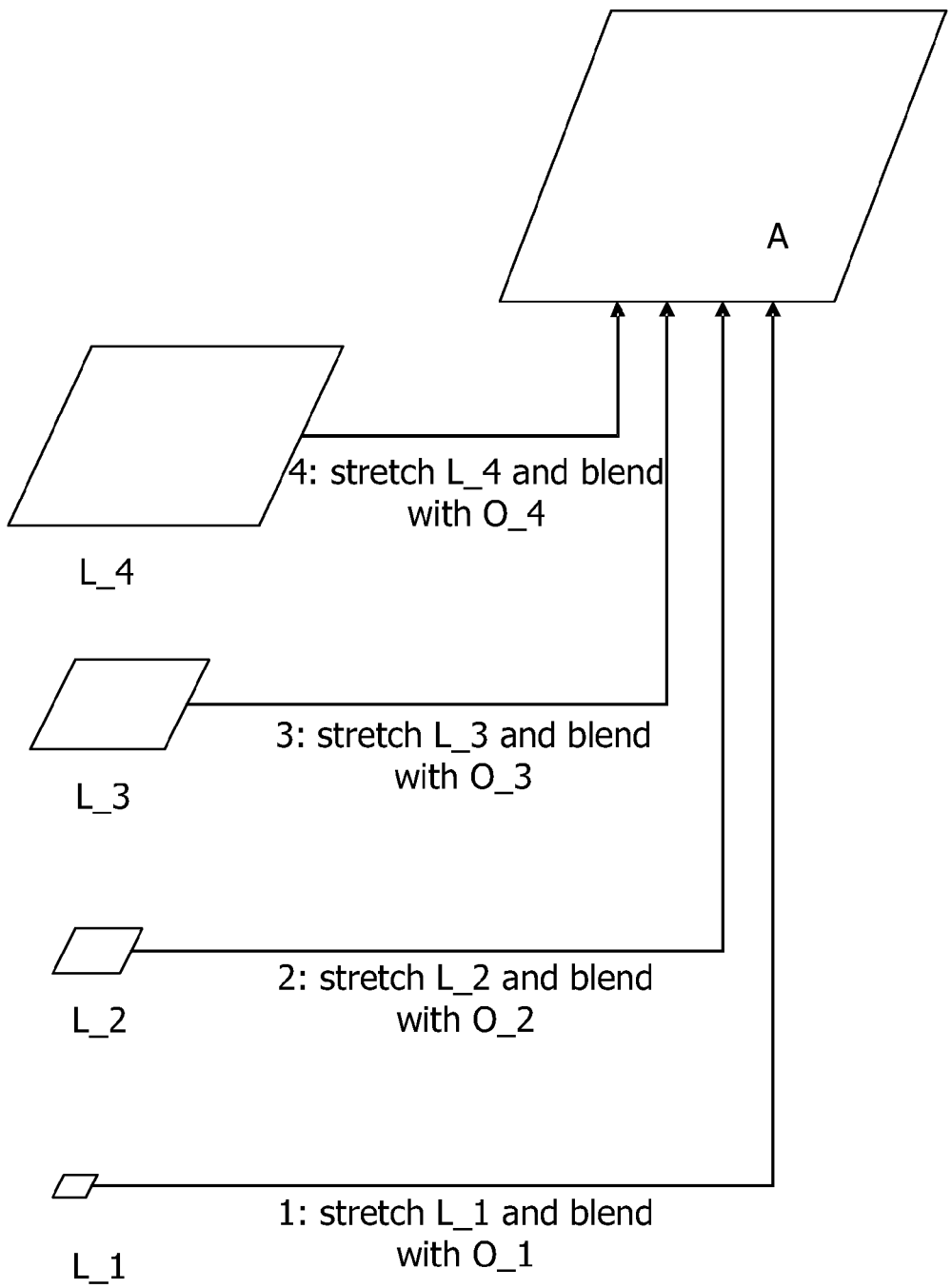
FIG. 1 is an exemplary block diagram illustrating a known method for blending image layers by blending each of the layers at the final image size.

In FIG. 1, an exemplary block diagram illustrates a known method for blending image layers by blending each of the layers at a final image size or destination area size. That is, layer 1 is upsampled or stretched to the final image size and blended with the final image, layer 2 is then upsampled to the final image size and blended with the final image, and so on. In this manner, every pixel in the final image is updated as each of the layers is processed. The cost for such layer processing grows linearly based on the quantity of layers processed. For N layers, the cost equals N times the final image size. As additional layers are included for processing to improve the resolution of each of the final images (e.g., one image per video frame), the processing time increases and thus the frame rate may degrade in existing systems at least because of the additional time to process the additional layer. In the example of FIG. 1, each pixel in the final image is touched by the upsampling and blending operations four times.

In contrast, referring to the figures, embodiments of the disclosure provide image 212 rendering using intermediate resolutions from multiple image layers 208. In some embodiments, the image layers 208 include vector as well as raster content, in any form of storage (e.g., compressed, video stream, etc.). Each image such as image 212 for a frame of video includes a plurality of the image layers 208 blended together. The plurality of images is arranged in order of increasing resolution. Each of the image layers 208 are upsampled and blended with the image layer 208 having the next higher resolution. However, in contrast to the existing system illustrated in FIG. 1, each of the image layers 208 is upsampled only to a resolution smaller than the final image size. In some embodiments, each of the image layers 208 is upsampled only to an approximate resolution of the image layer 208 having the next higher resolution. By reducing the quantity of pixels adjusted for each frame of video, the cost of processing additional layers per frame to improve the image quality is reduced. In an embodiment in which the resolutions of the image layers 208 form a geometric progression, the total overheard of the blending operations is bounded by a constant factor times a quantity of the pixels at the maximum resolution.

Aspects of the disclosure provide, at least, high-resolution image rendering without sacrificing the rendering frame rate. A crisp, high resolution, composite image having the proper image data for a given zoom or pan state is provided for each frame of animated navigation across the zoom or pan states. The animated navigation promotes an improved and interactive user experience, in part due to a dramatic reduction in the amount of time spent upsampling. The blending described herein provides continuous transition between the image layers 208 (e.g., spatial blending) and as the image layers 208 become available (e.g., temporal blending of newly obtained image data). Further, the image may be a still image from a motion video, and may include at least one or more of the following: textual data, nontextual data, vector data, and/or nonvector data.

In an example, map imagery may include twenty image layers 208 from the high-level view to a street view. Data from the twenty image layers 208 may at some point be blended together in the composition. While upsampled image layers 208 may become too blurry to convey useful information when scaled up too much in some embodiments, including those image layers 208 in the scene aids in the continuity of user experience.

While embodiments of the disclosure are described herein with reference to continuous zooming, panning, rotating, transforming, navigation, or other animation of an image while changing any view or perspective of the image, embodiments of the disclosure are applicable to any system for multi-layer image processing and/or display. Aspects of the disclosure are not limited to zooming or panning. Further, the functionality within the scope of the disclosure may be embodied in software, hardware, or a combination of both.

Figure 2:
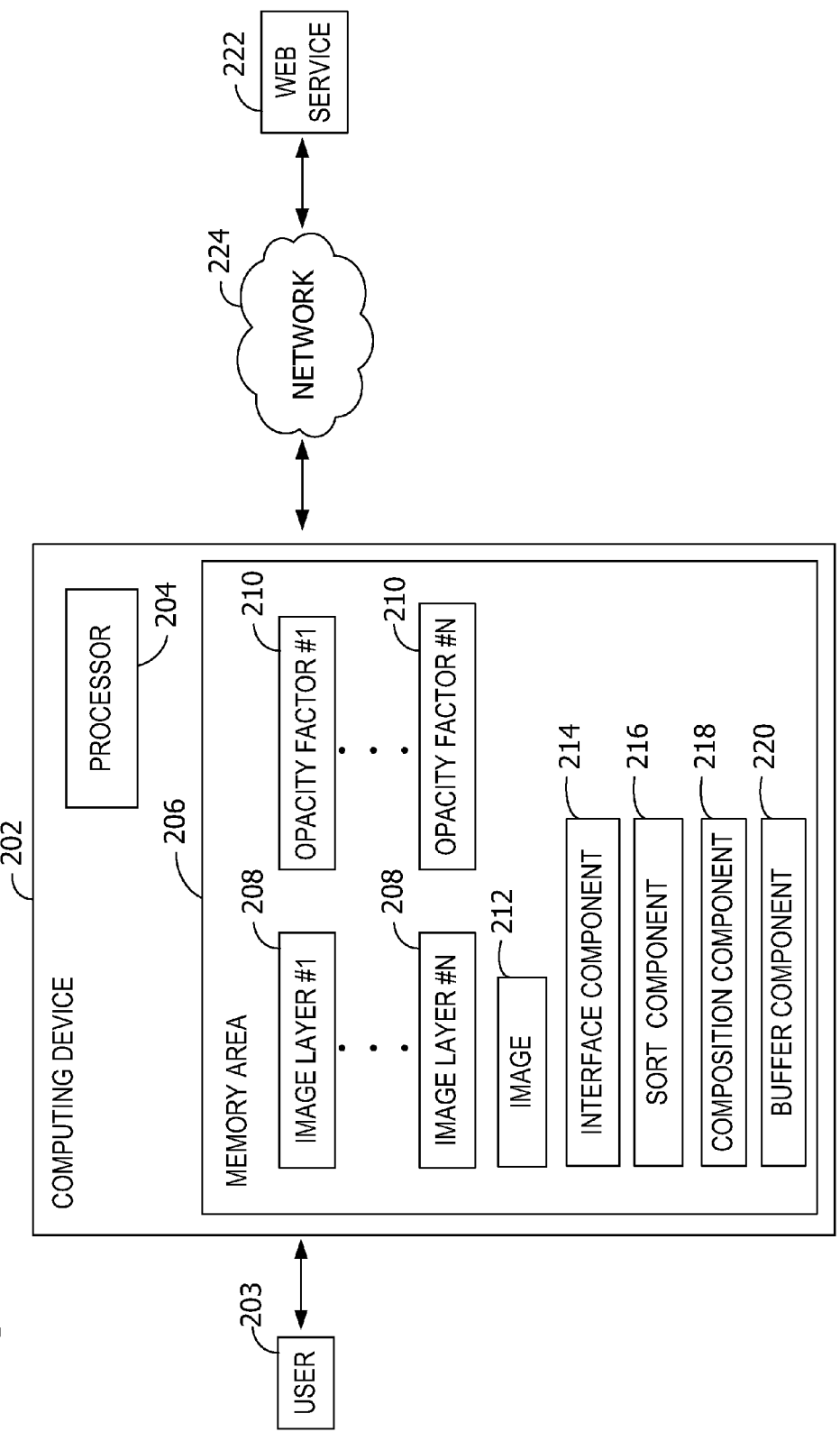
FIG. 2 is an exemplary block diagram illustrating a computing device having a memory area storing image layers and computer-executable components for blending the image layers.

Referring next to FIG. 2, an exemplary block diagram illustrates a computing device 202 having a memory area 206 storing image layers 208 and computer-executable components for blending the image layers 208. The memory area 206 associated with the computing device 202 stores the plurality of the image layers 208 such as image layer #1 through image layer #N. In some embodiments, a plurality of opacity factors 210 or blend factors, such as opacity factor #1 through opacity factor #N, corresponds to the plurality of image layers 208. The image layers 208 are blended based on the corresponding opacity factors 210.

The image layers 208 stored in the memory area 206 are accessible by the computing device 202. In the example of FIG. 2, the memory area 206 is within the computing device 202. However, the memory area 206 or any of the data stored thereon may be associated with a server or other computer, local or remote from the computing device 202, such that the data in the memory area 206 is available on any computing device (e.g., laptop, desktop, telephone, etc.) including the computing device 202.

In some embodiments, the image layers 208 are actively obtained or retrieved from a web service 222 or other image source by the computing device 202 via a network 224. The web service 222 includes, for example, a computer providing images of maps. In such an example, a user 203 of the computing device 202 may initiate a zoom or pan request on a displayed image such as image 212. The image 212, stored in the memory area 206, represents a composition of one or more of the image layers 208. In some embodiments, the image 212 represents a still image, and may correspond to a single frame of video.

Responsive to the zoom or pan request, the computing device 202 obtains or retrieves the image layers 208 corresponding to the request. In other embodiments, the image layers 208 are pre-loaded into the memory area 206, passively received by the computing device 202 (e.g., during off-peak periods for network traffic, or during periods of low-cost data traffic), or otherwise stored in the memory area 206 without being directly responsive to a request from the user 203.

The network 224 may be any network including, for example, the Internet or a wireless network such as a mobile data network, Wi-Fi network, or BLUETOOTH network. In embodiments in which the network 224 is a mobile network, the computing device 202 may be a mobile computing device such as a mobile telephone.

The computing device 202 has a processor 204 associated therewith. The processor 204 is programmed to execute computer-executable instructions for implementing aspects of the disclosure. In some embodiments, the processor 204 is programmed to execute instructions such as those illustrated in the figures (e.g., FIGS. 3, 4, and 6).

The memory area 206 or other computer-readable media further stores computer-executable components including an interface component 214, a sort component 216, a composition component 218, and a buffer component 220. These components are described below with reference to FIG. 4.

Figure 3:
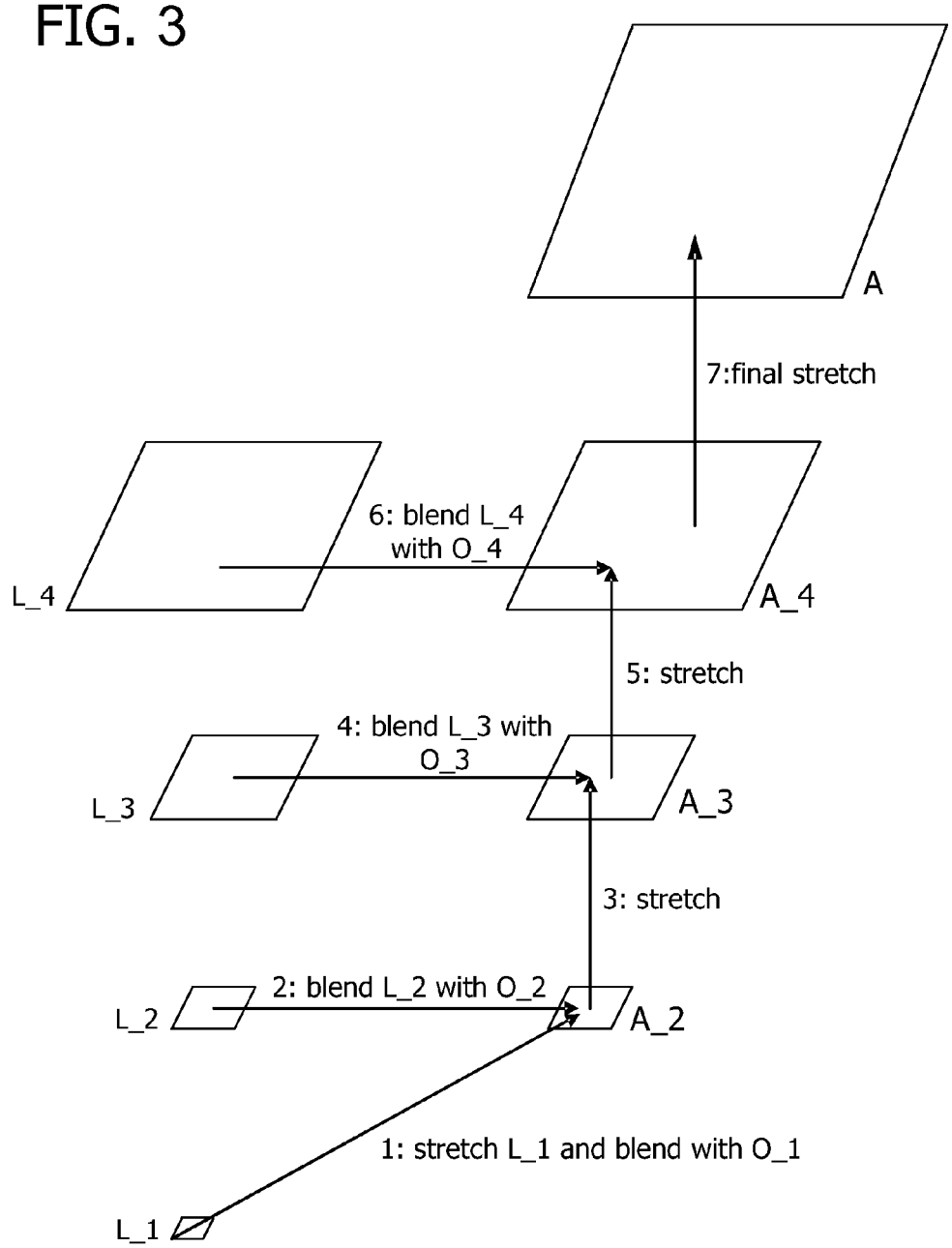
FIG. 3 is an exemplary block diagram illustrating the blending of the image layers at intermediate image sizes.

Referring next to FIG. 3, an exemplary block diagram illustrates the blending of the image layers 208 at intermediate image sizes. In the example of FIG. 3, layer one is stretched (e.g., upsampled) to the resolution of layer one. The opacity factor 210 associated with layer one is applied. The stretched layer one is blended with layer two at an opacity factor 210 associated with layer two. The blended layer two is stretched to the resolution of layer three. The stretched layer two is blended with layer three at an opacity associated with layer three. The blended layer three is stretched to the resolution of layer four. The stretched layer three is blended with layer four at an opacity associated with layer four. The blended layer four is stretched to the final image size.

In the example of FIG. 3, the total quantity of pixels touched by the stretching and blending operations equals the sum of the intermediate image resolutions. In FIG. 3, the intermediate resolutions include a_2, a_3, a_4, and A.

The resolutions of the ordered image layers 208 such as those shown in FIG. 3 may form a geometric progression or other increasing sequence. For example, each image layer 208 is twice the size of the immediately lower image layer 208. In such embodiments, the total overhead of the intermediate blending operations is bounded by a constant factor times the quantity of pixels at the maximum resolution (e.g., ⅓). Mathematically, the cost may be determined if given N layers to blend $L\_1$ through $L\_N$, and given corresponding opacities $O\_1$ through $O\_N$, and given two-dimensional sizes $S\_1$ through $S\_N$. Assuming an ordering where $\{S\_I\}$ form the geometric progression or other increasing sequence and that all layers are to be blended to cover a final image size or area A, a set of intermediate drawing surfaces $A\_2$ through $A\_N$ may be created where the two-dimensional size of $A\_I$ equals $S\_I$. In such an example, $\{A\_I\}$ may be constructed iteratively as follows:

1. If I>1, render $A\_(I-1)$ to $A\_I$
2. Render $L\_I$ into $A\_I$ with blend factor $O\_I$ Once $A\_N$ is produced, it is rendered into A. The cost of this approach is shown in Equation (1) below.

$$\text{Sum}\_(I)(C(A\_(I-1),1,A\_I)+C(L\_I,O\_I,A\_(I+1))) \qquad (1)$$

If C(L, O, A) is the cost of blending layer one to surface A with blend factor O, the cost of the prior art approach in FIG. 1 is shown in Equation (2) below.

$$\text{Sum}(I)(C(L\_I,O\_I,A)) \qquad (2)$$

Accordingly, when $L\_I$ are represented by images whose sizes double with each I, the difference between the cost from Equation (1) and the cost from Equation (2) is the difference between C×A, where C depends on the geometric series quotient (e.g., 1.333 when the quotient is two) and N×A. As such, embodiments of the disclosure enable image processing at a cost that is bounded by a constant factor times the quantity of pixels at the maximum resolution of the image layers 208 for a frame. Accordingly, the amount of time spent upsampling is reduced dramatically over previous solutions, thereby improving the user experience.

Figure 4:
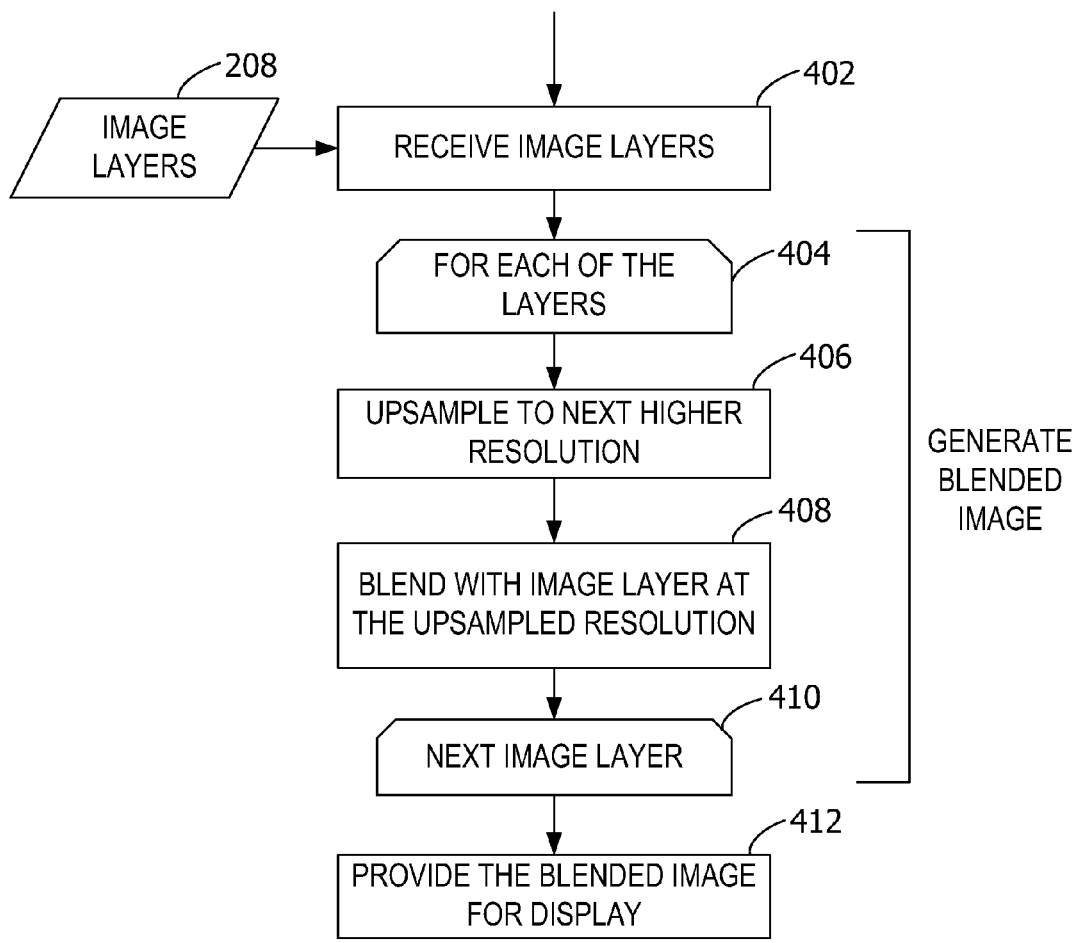
FIG. 4 is an exemplary flow chart illustrating the upsampling and blending of the image layers at intermediate image sizes.

Referring next to FIG. 4, an exemplary flow chart illustrates the upsampling and blending of the image layers 208 at the intermediate image resolutions. The image layers 208 are received at 402 for display by the computing device 202. For example, the received image layers 208 may correspond to a single video frame, or multiple video frames. One or more of the plurality of image layers 208 are composited or otherwise combined to generate a blended image.

The image layers 208 are ordered according to increasing resolution or size. The ordering may occur at the computing device 202, or the image layers 208 may be ordered prior to receipt by the computing device 202. For each of the image layers 208 at 404 starting with a first one of the image layers 208 having a lowest resolution, the image layer 208 is upsampled at 406 to the resolution associated with a next one of the ordered image layers 208 having the next higher resolution. The upsampled image layer 208 is blended with that next image layer 208 at 408. For example, the blending at 408 occurs based on the opacity factor 210 associated with that next image layer 208.

Processing continues at 410 at the next image layer 208 using the blended image layer 208. When the image layers 208 for a particular frame or image have been processed, the resulting blended image is provided for display on the computing device 202 at 412. The resulting blended image may be stored in a graphics buffer for access by a graphics card, provided as a video frame, transmitted to a display device for display, displayed to the user 203, or otherwise conveyed to the user 203.

In general, with reference to the components illustrated in FIG. 2, the interface component 214 accesses a plurality of the image layers 208 corresponding to a video frame for display on the computing device 202. For example, the interface component 214 accesses the plurality of the image layers 208 responsive to a zoom request received from the user 203. Each of the plurality of image layers 208 has an associated resolution. The sort component 216 orders the image layers 208 based on the associated resolution. The composition component 218 generates the blended image by upsampling and blending each of the ordered plurality of image layers 208 in succession starting with a first one of the image layers 208 having a lowest resolution. The upsampling includes upsampling each of the image layers 208 to the resolution of a next one of the image layers 208 having a higher resolution. The blending includes blending the upsampled image layer 208 with the next one of the image layers 208. The buffer component 220 stores the blended image generated by the composition component 218. The computing device 202 accesses the blended image to render the video frame.

In some embodiments, the composition component 218 is implemented as software for execution by one of the main processors in the computing device 202. In other embodiments, the composition component 218 is implemented as logic for execution by a dedicated graphics processor or co-processor.

Figure 5:
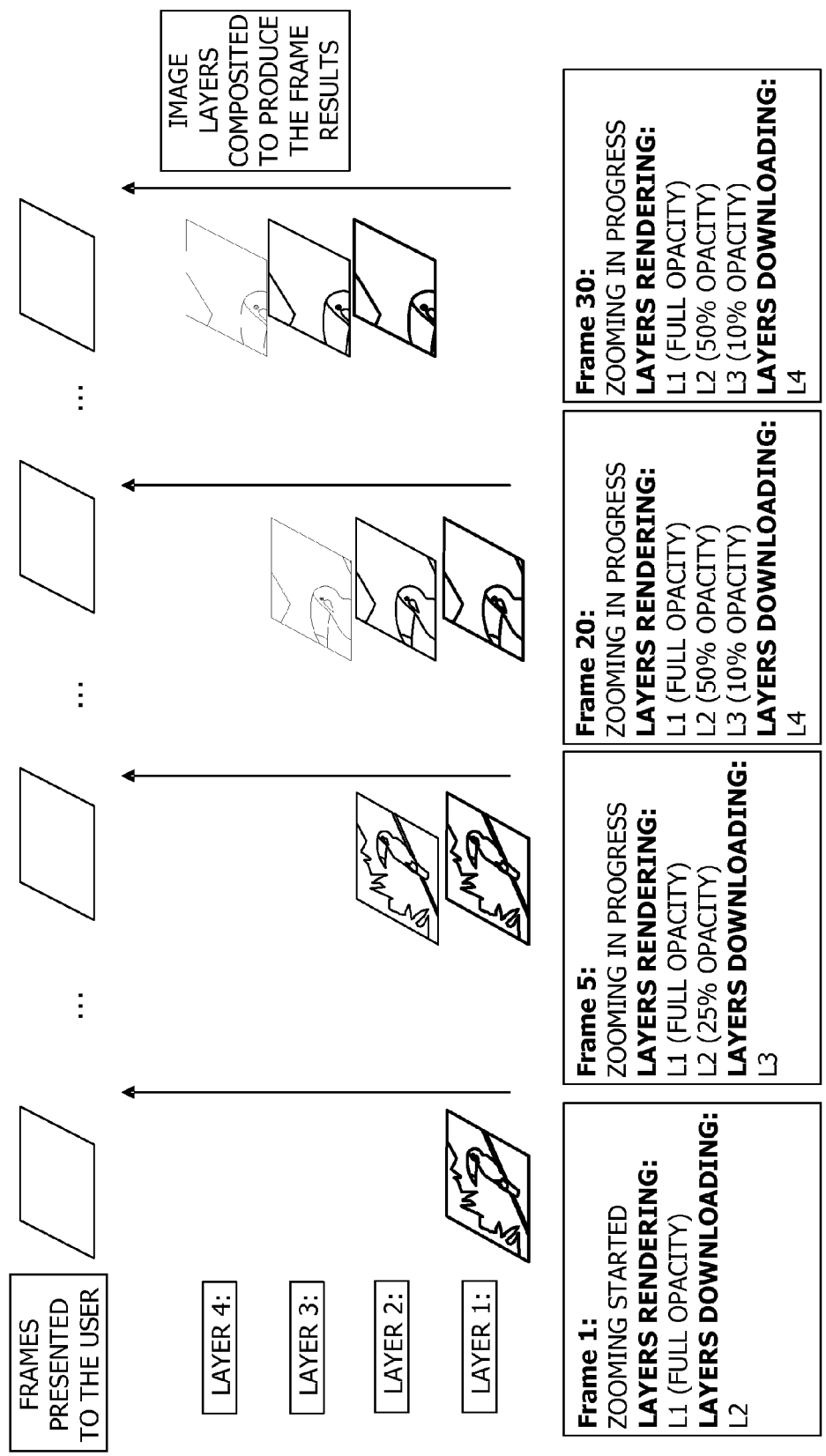
FIG. 5 is an exemplary block diagram illustrating continuous zooming animation.

Referring next to FIG. 5, an exemplary block diagram illustrates continuous zooming animation. The zooming animation is shown to the user 203 as a series of frames. For example, thirty or sixty frames per second may be rendered to the user 203 to provide the smooth, continuous zooming animation. In Frame 1, image layer one is rendered at full opacity (e.g., an opacity factor 210 of one). The user 203 then begins zooming (e.g., rotating a thumbwheel on a user interface selection device such as a mouse, or double-clicking on the region of interest in the image). Responsive to detection of the zooming, the data for image layer two is downloaded or accessed. In Frame 5, as zooming is in progress, image layer one at full opacity is composited with image layer two at 25% opacity. The data for image layer three is downloaded or accessed. In Frame 20, as zooming is still in progress, image layer one at full opacity is composited with image layer two at 50% opacity and image layer three at 10% opacity. The data for image layer four is downloaded or accessed. In Frame 30, the user 203 has reached a desired zoom level or zoom target. Image layer one is no longer included in the blended image. Rather, image layer two at full opacity is composited with image layer three at 50% opacity and image layer four at 25% opacity. No additional image layers 208 are downloaded or accessed in this example, as there is no longer an existing zoom request.

In the example of FIG. 5, the image layers 208 are dynamically obtained or received, or asynchronously fetched or decoded, responsive to multiple zoom requests from the user 203 as the user 203 continues to zoom into the image.

Figure 6:
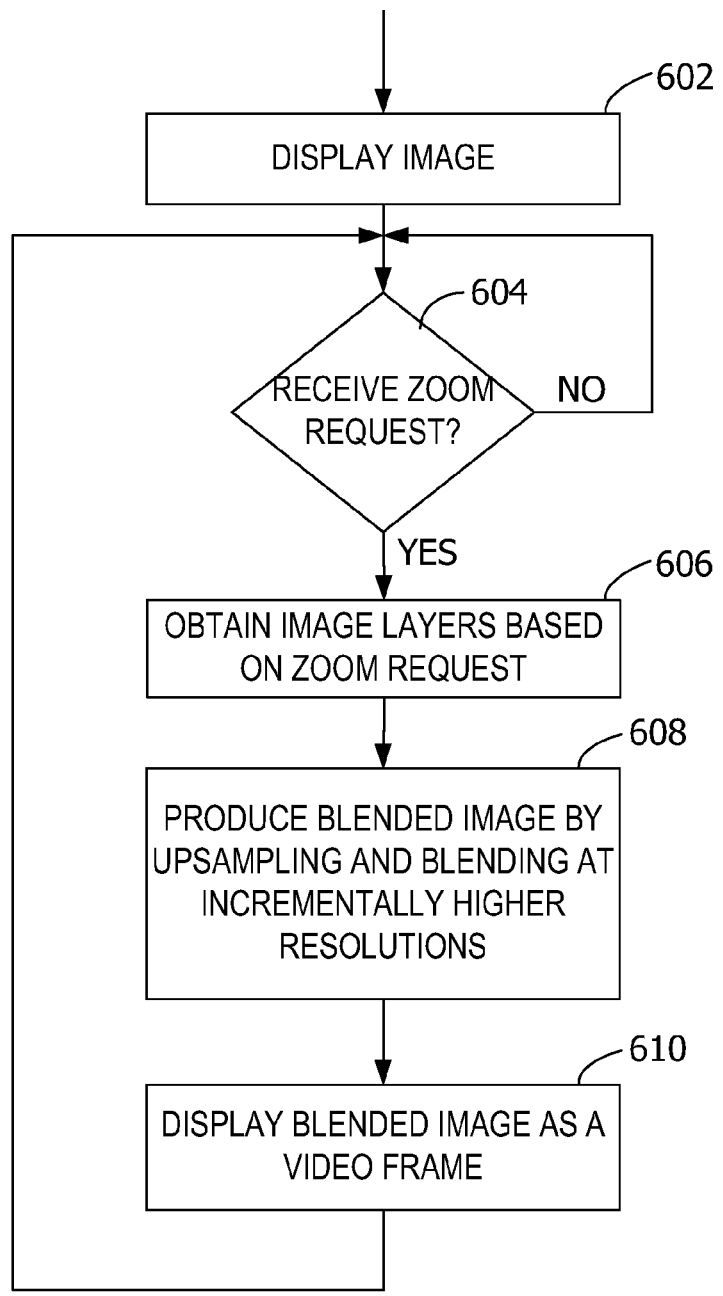
FIG. 6 is an exemplary flow chart illustrating the upsampling and blending of the image layers responsive to a zoom request from a user.

Referring next to FIG. 6, an exemplary flow chart illustrates the upsampling and blending of the image layers 208 responsive to a zoom request from the user 203. In the example of FIG. 6, the image displayed to the user 203 at 602 is a map, photograph, or any other visual representation. If a zoom request is received from the user 203 at 604, the computing device 202 obtains additional image layers 208 at 606. For example, the quantity of additional image layers 208 obtained at 606 is dependent on a target or desired zoom level derived from the zoom request. The additional image layers 208 include layers at varying resolutions, and at varying zoom levels between a current zoom level and a target zoom level specified in the zoom request. One or more of the additional image layers 208 are associated with each frame to be displayed to the user 203 during zooming animation. In some embodiments, at least two of the additional image layers 208 correspond to a representation of the image at a common or particular zoom level.

The image layers 208 associated with each of the frames are arranged in order of increasing resolution. Each of the image layers 208 are upsampled and blended at incrementally higher resolutions at 608 to produce a blended image, such as illustrated in FIG. 4. The upsampling and blending occurs iteratively. The blended image is displayed to the user 203 at 610 as a video frame in the zooming animation.

Exemplary Operating Environment

While aspects of the invention are described with reference to the computing device 202, embodiments of the invention are operable with any computing device. For example, aspects of the invention are operable with devices such as laptop computers, gaming consoles (including handheld gaming consoles), hand-held or vehicle-mounted navigation devices, portable music players, a personal digital assistant, an information appliance, a personal communicator, a hand-held television, or any other type of electronic device.

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for producing a composite image by iteratively upsampling and blending each of the plurality of image layers 208 at the incremental resolutions of each of the image layers 208, and exemplary means for optimizing a quantity of pixels adjusting during said upsampling and said blending by upsampling each of the image layers 208 only to the resolution of one of the image layers 208 having a next higher resolution.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for providing continuous zooming animation, said system comprising:
    a memory area for storing an image for display, said memory area further storing a plurality of image layers; and
    a processor programmed to:
        provide the image for display on a computing device;
        receive a zoom request from a user of the computing device;
        obtain, responsive to the received zoom request, a plurality of image layers ordered by increasing resolution;
        produce a blended image having a final resolution equal to a resolution of a last image layer by performing multiple iterations on the obtained image layers starting with a first image layer having a lowest resolution and ending with the last image layer having a highest resolution, each iteration comprising:
            upsampling the image layer to a next higher resolution associated with a next image layer; and
            blending the upsampled image layer with said next image layer; and
        provide the produced, blended image having the final resolution equal to the resolution of the last image layer for display on the computing device;
    wherein producing the blended image having the final resolution equal to the resolution of the last image layer has an overhead cost bounded by a constant factor multiplied by a quantity of pixels associated with the highest resolution.

2. The system of claim 1, wherein the memory area further stores an opacity factor associated with each of the plurality of image layers.

3. The system of claim 2, wherein the processor is programmed to blend the upsampled image layer based on the opacity factor.

4. The system of claim 1, wherein the processor is programmed to iteratively perform said upsampling and said blending for the image layers to produce the blended image for a frame of video corresponding to zooming animation.

5. The system of claim 1, wherein the processor is programmed to receive the zoom request by receiving a zoom level from the user.

6. The system of claim 1, further comprising means for producing a composite image by iteratively upsampling and blending each of the plurality of image layers at incremental resolutions associated with each of the image layers.

7. The system of claim 1, further comprising means for optimizing a quantity of pixels adjusting during said upsampling and said blending by upsampling each of the image layers only to the resolution of one of the image layers having the next higher resolution.

8. A method comprising:
    receiving, for display by a computing device, a plurality of image layers ordered according to increasing resolution;
    generating a blended image having one resolution from the plurality of image layers by performing multiple iterations on the received image layers starting with a first image layer having a lowest resolution and ending with a last image layer having a highest resolution, each iteration comprising:
        upsampling the image layer to a next higher resolution associated with a next image layer; and
        blending the upsampled image layer with said next image layer; and
    providing the generated, blended image having the one resolution corresponding to the resolution of the last image layer for display on the computing device;
    wherein generating the blended image having one resolution has an overhead cost bounded by a constant factor multiplied by a quantity of pixels associated with the highest resolution.

9. The method of claim 8, wherein providing the blended image for display comprises storing the blended image in a graphics buffer for access by a graphics card.

10. The method of claim 8, wherein providing the blended image layer for display comprises providing the blended image layer as a video frame.

11. The method of claim 8, wherein receiving the plurality of image layers comprises receiving a quantity of the image layers based on a desired zoom level.

12. The method of claim 8, wherein blending the upsampled image layer comprises blending the upsampled image layer based on an opacity factor.

13. The method of claim 8, wherein the blended image having one resolution is generated in response to receiving one or more of the following requests: zoom, pan, rotate, transform, and navigate.

14. The method of claim 8, further comprising selecting at least two of the plurality of image layers corresponding to a representation of the image at a common zoom level.

15. The method of claim 8, further comprising dynamically receiving additional image layers responsive to a zoom request from a user of the computing device.

16. The method of claim 8, wherein the provided blended image has a first resolution, and wherein each of the blended image layers has a resolution less than the first resolution.

17. The method of claim 8, wherein a size of the next one of the image layers is twice a size of the first one of the image layers.

18. One or more computer devices storing computer-executable components, said components comprising:
   an interface component for accessing a plurality of image layers corresponding to a video frame for display on a computing device, the plurality of image layers comprising image layers from a first image layer to a last image layer, each of said plurality of image layers having a resolution associated therewith, the associated resolution increasing from the first image layer to the last image layer;
   a sort component for ordering the image layers based on the associated resolution;
   a composition component for generating a blended image having a final resolution that is equal to the resolution associated with the last image layer by performing multiple iterations comprising upsampling and blending each of the ordered image layers through successive intermediate resolutions starting with the first image layer having a lowest resolution and ending with the last image layer having a highest resolution, wherein said upsampling each of the ordered image layers includes upsampling the image layer to a next higher resolution of a next image layer, and wherein said blending comprises blending the upsampled image layer with said next image layer; and
   a buffer component for storing the blended image having the final resolution equal to the resolution of the last image layer, generated by the composition component, wherein the computing device accesses the generated, blended image to render the video frame;
   wherein generating the blended image having the final resolution that is equal to the resolution associated with the last image layer has an overhead cost bounded by a constant factor multiplied by a quantity of pixels associated with the highest resolution.

19. The one or more computer devices of claim 18, wherein the interface component receives a zoom request from a user of the computing device, and wherein the interface component accesses the plurality of image layers responsive to the received zoom request.

20. The one or more computer devices of claim 18, wherein the composition component is executed by a graphics processor.

* * * * *